US009466838B2

(12) United States Patent
Anji Reddy et al.

(10) Patent No.: US 9,466,838 B2
(45) Date of Patent: Oct. 11, 2016

(54) LITHIUM/GRAPHITE FLUORIDE PRIMARY BATTERY AND METHOD FOR ITS MANUFACTURING

(71) Applicant: KARLSRUHER INSTITUT FUER TECHNOLOGIE, Karlsruhe (DE)

(72) Inventors: Munnangi Anji Reddy, Eggenstein-Leopoldshafen (DE); Ben Breitung, Karlsruhe (DE); Maximilian Fichtner, Oftersheim (DE); Horst Hahn, Seeheim-Jugenheim (DE)

(73) Assignee: KARLSRUHER INSTITUT FUER TECHNOLOGIE, Karlsruhe (DE)

( * ) Notice: Subject to any disclaimer, the term of this patent is extended or adjusted under 35 U.S.C. 154(b) by 258 days.

(21) Appl. No.: 14/133,667

(22) Filed: Dec. 19, 2013

(65) Prior Publication Data
US 2014/0178750 A1     Jun. 26, 2014

(30) Foreign Application Priority Data
Dec. 21, 2012   (EP) .................................... 12008515

(51) Int. Cl.
*H01M 6/04*     (2006.01)
*H01M 4/583*    (2010.01)
*H01M 4/06*     (2006.01)
(Continued)

(52) U.S. Cl.
CPC ............. *H01M 4/5835* (2013.01); *H01M 4/04* (2013.01); *H01M 4/06* (2013.01); *H01M 4/133* (2013.01); *H01M 4/1393* (2013.01); *H01M 6/16* (2013.01); *H01M 6/188* (2013.01); *H01M 4/382* (2013.01); *Y02E 60/122* (2013.01); *Y02P 70/54* (2015.11); *Y10T 29/49108* (2015.01)

(58) Field of Classification Search
CPC ...... H01M 4/04; H01M 4/5835; H01M 4/06; H01M 6/188; H01M 4/133; H01M 4/1393; H01M 6/16; Y10T 29/49108
USPC ............................................... 429/188, 231.7
See application file for complete search history.

(56) References Cited

U.S. PATENT DOCUMENTS

2002/0012844 A1   1/2002   Gan et al.
2007/0281213 A1   12/2007  Pyszczek
(Continued)

FOREIGN PATENT DOCUMENTS

EP      1 156 541 A2    11/2001
EP      2 058 890 A2    5/2009
JP      2009-283344 A   12/2009

OTHER PUBLICATIONS

Y. Li et al.: "The improved discharge performance of Li/CF$_x$ batteries by using multi-walled carbon nanotubes as conductive additive", Journal of Power Sources, vol. 196, pp. 2246-2250 (2011).
S. S. Zhang et al.: "Enhancement of discharge performance of Li/CF$_x$ cell by thermal treatment of CF$_x$ cathode material", Journal of Power Sources, vol. 188, pp. 601-605 (2009).
(Continued)

*Primary Examiner* — Gary Harris
(74) *Attorney, Agent, or Firm* — Norman B. Thot

(57) ABSTRACT

A lithium/graphite fluoride primary battery prepared by a process which includes providing a graphite fluoride powder, mechanically milling the graphite fluoride powder so as to obtain an active material, providing a mixture comprising the active material and an electrically conductive carbon so as to form a part of a positive electrode, providing a body comprising lithium as a part of a negative electrode, and forming an electrochemical cell with the positive electrode and the negative electrode.

16 Claims, 4 Drawing Sheets

(51) Int. Cl.
*H01M 6/16* (2006.01)
*H01M 6/18* (2006.01)
*H01M 4/04* (2006.01)
*H01M 4/133* (2010.01)
*H01M 4/1393* (2010.01)
*H01M 4/38* (2006.01)

(56) References Cited

U.S. PATENT DOCUMENTS

| | | | |
|---|---|---|---|
| 2009/0117457 A1 | 5/2009 | Davis et al. | |
| 2010/0075226 A1* | 3/2010 | Pham | H01M 4/134 429/219 |
| 2010/0203390 A1 | 8/2010 | Takamura et al. | |
| 2011/0206990 A1* | 8/2011 | Akagi | H01M 4/0471 429/231.1 |
| 2012/0126182 A1 | 5/2012 | Zhang et al. | |
| 2013/0065126 A1* | 3/2013 | Caldwell | H01B 1/12 429/212 |

OTHER PUBLICATIONS

S. S. Zhang et al.: "Carbothermal treatment for the improved discharge performance of primary Li/$CF_x$ battery", Journal of Power Sources, vol. 191, pp. 648-652 (2009).

Q. Zhang et al.: "Carbon-coated fluorinated graphite for high energy and high power densities primary lithium batteries", Journal of Power Sources, vol. 195, pp. 2914-2917 (2010).

P. Lam et al.: "Physical characteristics and rate performance of $(CF_x)_n$ (0.33<x<0.66) in lithium batteries", Journal of Power Sources, vol. 153, pp. 354-359 (2006).

R. Yazami et al.: "Fluorinated carbon nanofibres for high energy and high power densities primary lithium batteries", Electrochemistry Communications, vol. 9, pp. 1850-1855 (2007).

J. A. Read et al.: "Mechanochcmical Synthesis of Carbon Fluorides", Electrochemical and Solid-State Letters, vol. 12, No. 1, pp. A16-A18 (2009).

R. Janot et al.: "Ball-milling in liquid media Applications to the preparation of anodic materials for lithium-ion batteries", Progress in Materials Science, vol. 50, pp. 1-92 (2005).

* cited by examiner

LITHIUM/GRAPHITE FLUORIDE PRIMARY BATTERY AND METHOD FOR ITS MANUFACTURING

CROSS REFERENCE TO PRIOR APPLICATIONS

Priority is claimed to European Patent Application No. EP 12008515.4, filed Dec. 21, 2012. The entire disclosure of said application is incorporated by reference herein.

FIELD

The present invention relates to a lithium/graphite fluoride primary battery and a method for its manufacture.

Primary electrochemical cells, also denoted as primary batteries, constitute an important class of energy storage devices with various applications which include portable electronics and implantable medical devices. In contrast to a rechargeable secondary battery, a primary battery is utilized only once and is thereafter discarded.

Among primary battery technologies, lithium-based batteries offer a high energy density. A graphite fluoride battery, also denoted as a Li/CFx battery, where fluorine F and graphite C form a common body with a relative atomic amount x of fluorine to graphite, offers a theoretical capacity of 2,180 Wh/kg which exceeds the theoretical capacity of other primary batteries, including $Li/SOCl_2$ and $Li/MnO_2$.

In practice, however, the Li/CFx battery delivers its theoretical specific capacity and voltage only under the condition that the Li/CFx battery is discharged at a comparatively low rate. It is observed that both the discharge capacity and the discharge voltage diminish considerably at higher discharge rates. As a result, the energy density of the Li/CFx battery, which is half the product of the specific capacity and of the voltage per unit volume, requires improvement at higher discharge rates, in particular, for high drain applications.

A number of approaches exist to improve the power density, which is defined as the time rate of the energy transfer per unit volume, of the Li/CFx battery. Here, in a twofold strategy, an improvement of the electronic conductivity of the electrode material was supplemented by a reduction of the crystallite size of the electrode material, which in turn reduces the path lengths for lithium diffusion. Since the graphite monofluoride CFx with x~1 constitutes an electrical insulator, various attempts have been directed to improve the electronic conductivity of the CFx.

First, Y. Li, Y. Chena, W. Fenga, F. Dingc, X. Liu, J. Power Sources 2011, 196, 2246-50; S. S. Zhang, D. Foster, J. Read, J. Power Sources 2009, 188, 601-605; S. S. Zhang, D. Foster, J. Read, J. Power Sources 2009, 191, 648-52; as well as Q. Zhang, S. D'Astorg, P. Xiao, X. Zhang, L. Lu, J. Power Sources 2010, 195, 2914-17, improved the electronic conductivity of CFx materials by adding a conducting carbon coating to the graphite fluoride.

Secondly, P. Lam, R. Yazami, J. Power Sources 2006, 153, 354-359; R. Yazami, A. Hamwi, K. Guerin, Y. Ozawa, M. Dubois, J. Giraudet, F. Masin, Electrochem. Commun. 2007, 9, 1850-55; and J. A. Read and W. K. Behl, Electrochem. Solid-State Lett., 2009, 12 (1), A16-18, applied partially or sub-fluorinated graphite fluoride materials which are able to deliver a high power density. A disadvantage of this method is, however, that the theoretical specific capacity of the material is simultaneously reduced.

SUMMARY

An aspect of the present invention is to provide a lithium/graphite fluoride primary battery and a method for its manufacture which overcomes the limitations described in the prior art.

An aspect of the present invention is to also provide a lithium/graphite fluoride primary battery with both a high energy density and a high power density without losing the high intrinsic specific capacity of the graphite fluoride material.

An additional aspect of the present invention is to provide a method for manufacturing a lithium/graphite fluoride primary battery which can be easily performed.

In an embodiment, the present invention provides a lithium/graphite fluoride primary battery prepared by a process which includes providing a graphite fluoride powder, mechanically milling the graphite fluoride powder so as to obtain an active material, providing a mixture comprising the active material and an electrically conductive carbon so as to form a part of a positive electrode, providing a body comprising lithium as a part of a negative electrode, and forming an electrochemical cell with the positive electrode and the negative electrode.

DETAILED DESCRIPTION

Figure 1:
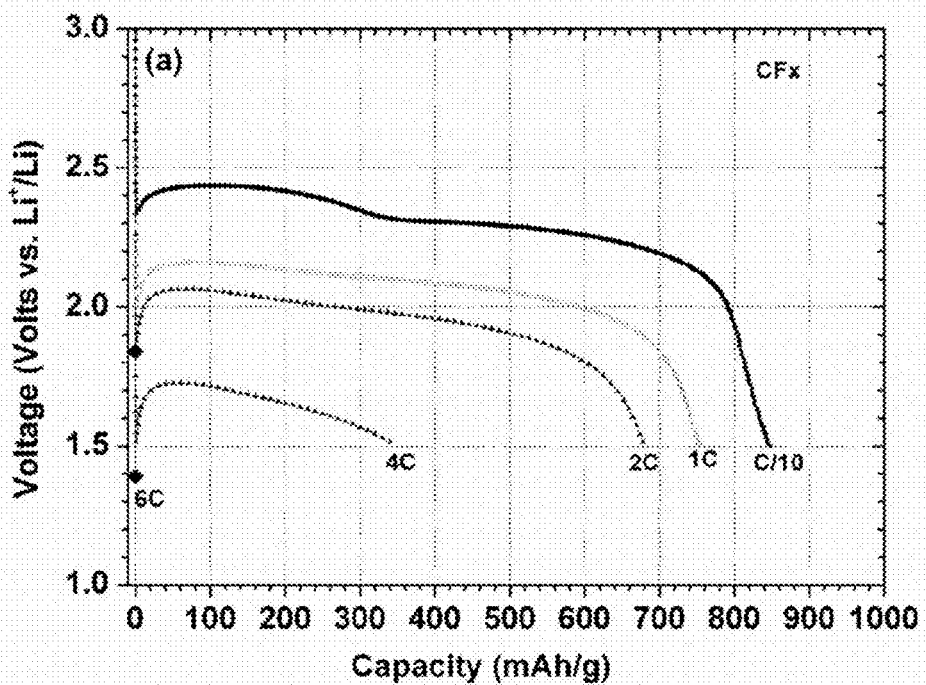
FIG. 1 shows discharge curves of a pristine CFx sample obtained at different current densities.

A lithium/graphite fluoride primary battery according to the present invention comprises an electrochemical cell in which a lithium body, for example, a lithium foil, is assembled as a negative electrode and an active material is assembled as a positive electrode, where the active material was obtained in a process which includes the step of ball milling an amount of a graphite fluoride powder. The active material obtained through this process is readily distinguished from a pristine graphite fluoride powder:

By an increased BET surface area of the active material in the range from 250 to 300 $m^2\ g^{-1}$;

By an increased total pore volume of the active material in the range from 0.12 $cm^3\ g^{-1}$ and 0.15 $cm^3\ g^{-1}$;

By an increased tap density of the active material, being a factor between 3 and 5 compared to the pristine material; and By a grain size of ball milled material between 50 nm and 1000 nm, for example, between 100 nm and 500 nm.

In an embodiment of the present invention, the process by which the lithium/graphite fluoride primary battery is prepared includes at least the following steps (a) to (c) performed in the sequence (a), (b), and (c).

According to step (a), an amount of a graphite fluoride powder is provided. The graphite fluoride powder provided can, for example, include a CFx compound where x is within the range from 0.1 and 2, for example, from 0.5 to 1.5, or for example, from 1.05 to 1.2.

According to step (b), the amount of graphite fluoride powder undergoes a treatment characterized by an application of mechanical milling. By this additional step of mechanical milling, the graphite fluoride powder which is provided during step (a) is transformed into an active material which is suitable as electrode material for a positive electrode in an electrochemical cell.

In an embodiment of the present invention, the mechanical milling can, for example, be performed in a ball mill which includes a vial made from a hard material, for example, tungsten carbide (WC) or hardened steel, and respective balls. The selected amount of graphite fluoride powder can, for example, be rotated in the ball mill with a frequency in the range from 50 revolutions per minute (rpm) to 1000 rpm, for example, from 100 rpm to 400 rpm, where the rotation is performed over a period from 1 minute to 1 day, for example, from 30 minutes to 6 hours. It is thereby beneficial to apply a ball to powder ratio in the range from 5:1 to 100:1, for example, from 10:1 to 50:1.

According to step (c) an electrochemical cell is finally assembled by employing a mixture of the active material provided by step (b) with an electrically conducting carbon, for example, graphite or acetylene black or a material which comprises graphite or acetylene black as a positive electrode, and combining it with a lithium body, for example, a lithium foil, as a negative electrode, a glass fiber sheet as, for example, a separator, and an electrolyte, for example, a solution which includes an inorganic salt and ethylene carbonate (EC) and/or dimethyl carbonate (DMC).

In an embodiment of the present invention, the positive electrode can, for example, be prepared by a process which comprises the following steps (d) to (f), performed in the sequence (d), (e), and (f). First, according to step (d), a mixture of the active material with acetylene black and an organic solvent is provided. Then, according to step (e), a slurry which includes at least a solvent and the mixture is spread on an electrically conducting substrate, for example, a steel sheet. The positive electrode is obtained after drying the slurry according to step (f) by vaporizing the solvents, for example, by applying heat.

The prior art has described that grain refinement by grinding and/or ball milling leads to an inflation of the volume and, hence, to a lowering of the powder density. It is therefore surprising that applying mechanical milling to the graphite fluoride powder considerably reduces the particle size of the active material, which results in a larger BET surface area and an increased value for the total pore volume. Ball milling of $CF_x$ also surprisingly leads to an increase of the powder density of the material so that the volumetric energy density of the electrode could be increased.

Both the energy density and the power density of a battery which includes such an active material are consequently considerably improved compared to a sample which does not undergo mechanical milling ('pristine sample'). The increase of both the energy density and the power density can moreover be achieved by the process according to the present invention without losing the high intrinsic specific capacity of the graphite fluoride powder material used as starting material for the mechanical milling.

The improvement in the performance of a battery according to the present invention is interpreted in terms of the particle size of the active material. The rate limiting steps in the discharge reaction in the active material appear to be, on the one hand, the diffusion of $Li^+$ ions within the layers of CFx and, on the other hand, the blocking of the layers by the discharge product LiF. Ball milling is assumed to reduce the particle size compared to the pristine CFx and thus, on the one hand, reduces the diffusion path lengths for $Li^+$ ions and a higher surface area and, on the other hand, supports the accommodation of the discharge product LiF.

The present invention will hereinafter be described based on non-limiting specific samples with reference to the drawings.

Samples were prepared from a commercially available graphite fluoride material. The carbon content in the samples was investigated by elementary analysis, and the composition was determined to be CFx with x~1.1.

Ball milling of the samples was performed in a tungsten carbide (WC) vial with balls. Various samples were milled at 200 rpm, 300 rpm and 400 rpm over a period of 2 hours with a ball to powder ratio of 24:1. The samples treated in this way were denoted as CFx, CFx200, CFx300 and CFx400 for pristine material and for material which was ball-milled at 200 rpm, at 300 rpm, and at 400 rpm, respectively.

Electrochemical studies were performed in so-called Swagelok cells. The electrode fabrication and electrochemical cells were assembled in an argon filled glove box. Electrodes were fabricated by mixing an active material with acetylene black and poly-vinylidene fluoride-hexafluoro propylene (PVDF-HFP) in a weight ratio of 70:20:10. A slurry of the mixture was prepared by applying N-methyl-2-pyrrolidinone as a solvent. The slurry was spread on a stainless steel foil with an area of 1.13 cm$^2$ and dried on hot plate at 160° C. for 12 hours. Each electrode contained 2.0-3.0 mg of the active material. Lithium foil was applied as a negative electrode, and a borosilicate glass fiber sheet (separator) saturated with 1 M $LiPF_6$ in 1:1 ethylene carbonate (EC)/dimethyl carbonate (DMC) was employed as an electrolyte. The cells were placed in an incubator to maintain a constant temperature of 25° C. The electrochemical studies were carried out in a battery cycling unit.

Nitrogen-physisorption measurements were conducted at 77 K. Prior to conducting measurements, the samples were degassed at 150° C. for 12 hours in vacuum. Pore size distributions were calculated on the basis of a DFT model which assumes slit-shaped pores. The differential pore volume shows that ball milled samples contained fewer micropores but more mesopores which led to an increase of the total pore volume from 0.1 in the pristine sample to a value between 0.134 cm$^3$ g$^{-1}$ and 0.148 cm$^3$ g$^{-1}$ in the ball-milled samples.

Table 1 shows physical parameters of CFx samples before and after ball milling. The tap density of the ball-milled samples surprisingly increased three times compared to pristine CFx.

TABLE 1

| Sample | BET surface area (m$^2$g$^{-1}$) | Cumulative pore volume (cm$^3$ g$^{-1}$) | Tap density (g cm$^{-3}$) |
| --- | --- | --- | --- |
| $CF_x$ | 213.15 | 0.096 | 0.30 |
| $CF_x200$ | 285.21 | 0.148 | 0.92 |
| $CF_x300$ | 265.76 | 0.135 | 1.07 |
| $CF_x400$ | 267.38 | 0.139 | 1.02 |

Table 2 lists the current density, the average voltage, the discharge capacity, the specific energy, and the power density of the studied CFx samples.

TABLE 2

| Sample Type | Discharge Rate | Current Density (mA/g) | Average Discharge Voltage (V. vs. Li/Li+) | Discharge Capacity (mAh/g) | Energy Density (Wh/kg) | Power Density (W/kg) |
|---|---|---|---|---|---|---|
| CFx | 0.1 C | 90 | 2.274 | 847 | 1927 | 204 |
|  | 1 C | 896 | 2.049 | 753 | 1544 | 1835 |
|  | 2 C | 1792 | 1.943 | 680 | 1321 | 3481 |
|  | 4 C | 3584 | 1.649 | 349 | 576 | 5910 |
|  | 6 C | 5369 | 1.5 | 0.04 | 0.06 | 8064 |
| CFx200 | 0.1 C | 90 | 2.328 | 844 | 1964 | 209 |
|  | 1 C | 896 | 2.148 | 776 | 1668 | 1924 |
|  | 2 C | 1792 | 2.032 | 730 | 1484 | 3641 |
|  | 4 C | 3584 | 1.903 | 576 | 1096 | 6820 |
|  | 6 C | 5369 | 1.793 | 327 | 586 | 9639 |
| CFx300 | 0.1 C | 90 | 2.348 | 849 | 1994 | 210 |
|  | 1 C | 896 | 2.138 | 819 | 1752 | 1918 |
|  | 2 C | 1792 | 2.072 | 720 | 1485 | 3713 |
|  | 4 C | 3584 | 1.903 | 580 | 1105 | 6820 |
|  | 6 C | 5369 | 1.834 | 436 | 799 | 9860 |
| CFx400 | 0.1 C | 90 | 2.354 | 859 | 2024 | 211 |
|  | 1 C | 896 | 2.16 | 767 | 1659 | 1937 |
|  | 2 C | 1792 | 2.033 | 688 | 1398 | 3643 |
|  | 4 C | 3584 | 1.908 | 485 | 926 | 6838 |
|  | 6 C | 5369 | 1.796 | 384 | 690 | 9641 |

FIGS. 1-4 shows electrochemical discharge curves of the pristine and the ball-milled CFx samples from Table 2 obtained at different current densities. The theoretical specific capacity of CFx with x~1.1 equals to 896 mAh $g^{-1}$. A 1C rate is consequently defined as the electrochemical reaction of an amount of 1.1 Li in an hour, so that a 0.1C rate, a 2C rate, a 4C rate, and 6C rate deliver the electrochemical discharge rate of 1.1 Li in 0.1, 2, 4, and 6 hours, respectively. The specific capacities were calculated with respect to the content of active material in the electrode.

Figure 2:
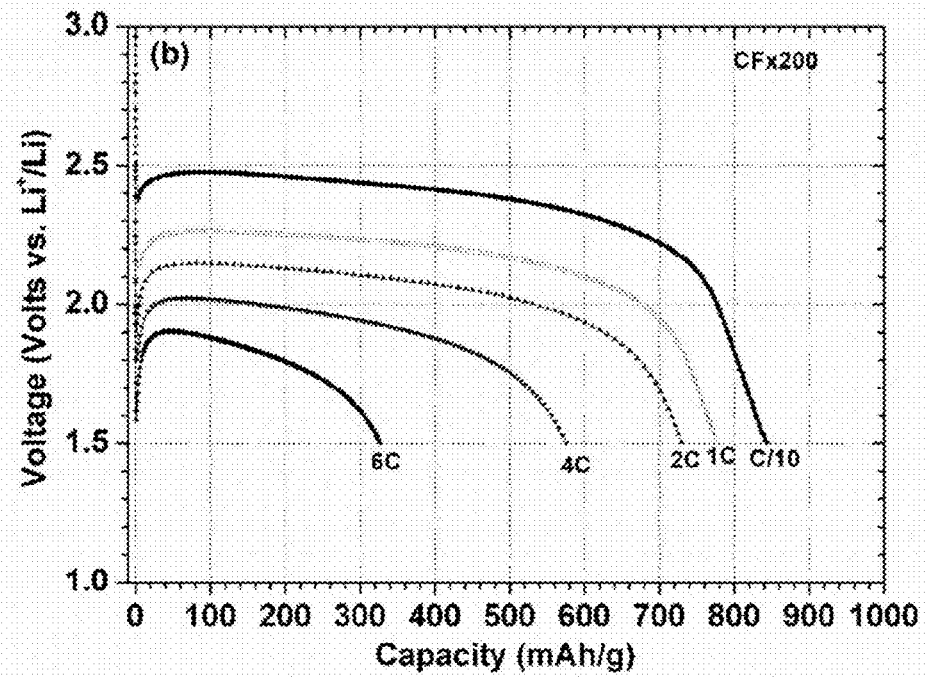
FIG. 2 shows discharge curves of a CFx 200 sample obtained at different current densities.
Figure 3:
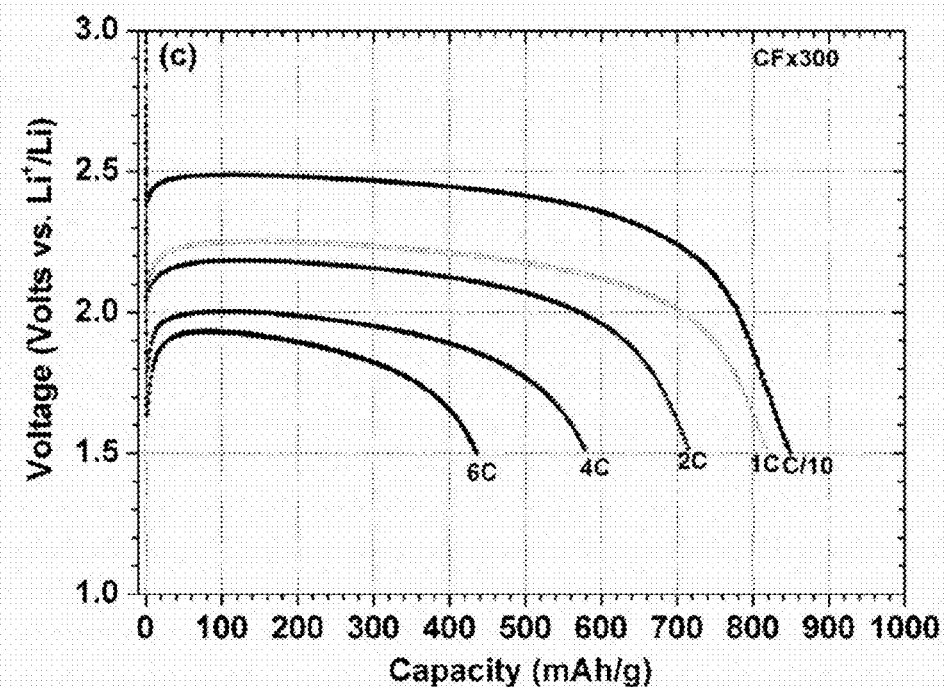
FIG. 3 shows discharge curves of a CFx 300 sample obtained at different current densities.
Figure 4:
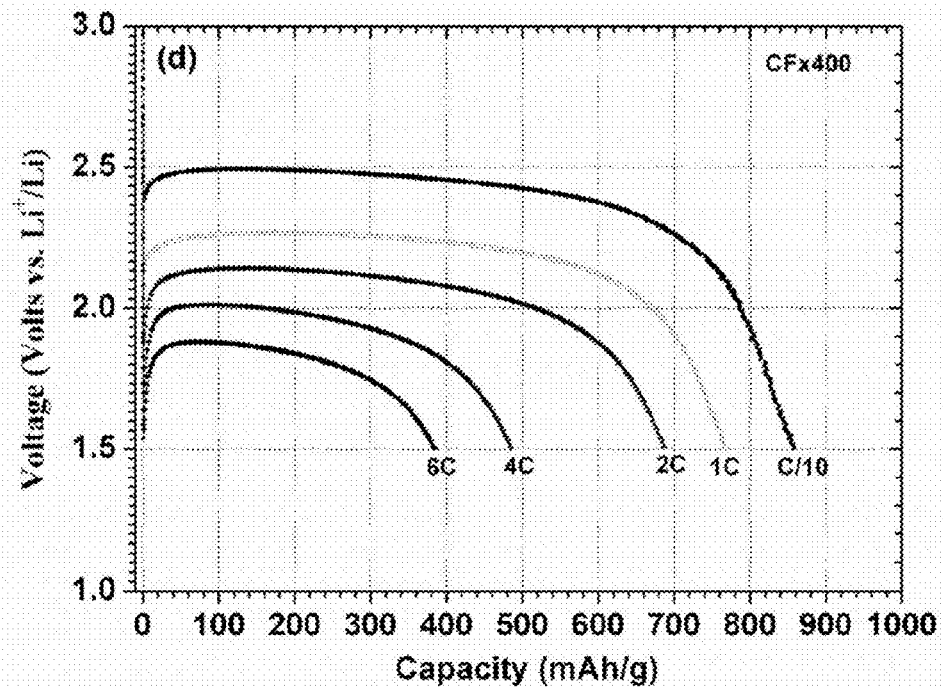
FIG. 4 shows discharge curves of a CFx 400 sample obtained at different current densities.

FIG. 1 shows that, in the pristine sample CFx, the discharge curve obtained at the C/10 rate has two plateaus which are centered at 2.43 V and 2.30 V, respectively. Since CFx generally reacts at a single voltage plateau, the observation of two plateaus can be attributed to an inhomogeneous particle size or to reactions in kinetically hindered regions due to the bigger particle size of pristine CFx. After ball milling, which broke bigger particles into smaller particles, all ball-milled samples exhibit a single one voltage plateau as shown in FIGS. 2-4. The discharge capacity of all ball-milled samples discharged at the C/10 rate is almost equal; however, the average discharge voltage increased considerably from 2.27 V for pristine CFx to 2.35 V for CFx400.

When discharged at the 1C rate, the discharge voltage drops according to FIG. 1 to 2.04 V with a discharge capacity of 753 mAh $g^{-1}$. In comparison to pristine CFx, all ball-milled samples exhibit a 0.1 V higher discharge voltage with a marginal increase in specific capacity.

However, at the 4C rate, a significant decrease in the voltage and specific capacity can be observed in FIG. 1 in the pristine sample compared to ball-milled samples in FIG. 2-4 which is nicely reflected in the energy density values of Table 2. The energy density is almost doubled for ball-milled sample at the 4C rate compared to the pristine sample.

At the 6C rate, the pristine sample in FIG. 1 showed no accountable capacity and the battery became short circuited. According to FIGS. 2-4, all ball-milled samples showed higher energy densities compares to the pristine sample's energy density at the 4C rate.

Figure 5:
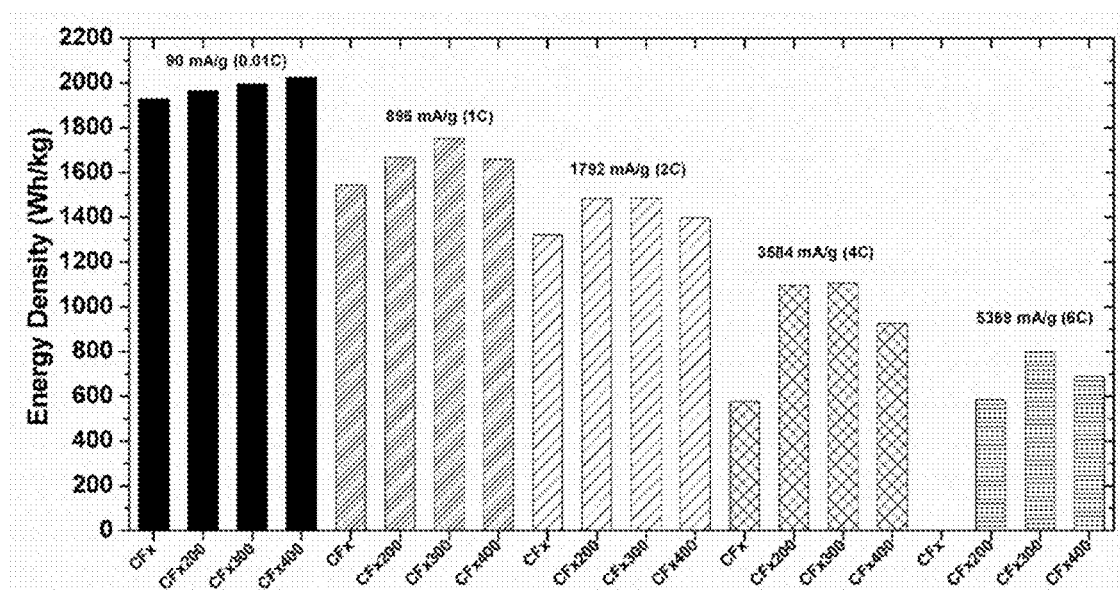
FIG. 5 depicts the energy densities of CFx samples at different current densities.

FIG. 5 assembles all values for the energy densities of both the pristine and the ball-milled samples at different discharge rates and current densities.

Figure 6:
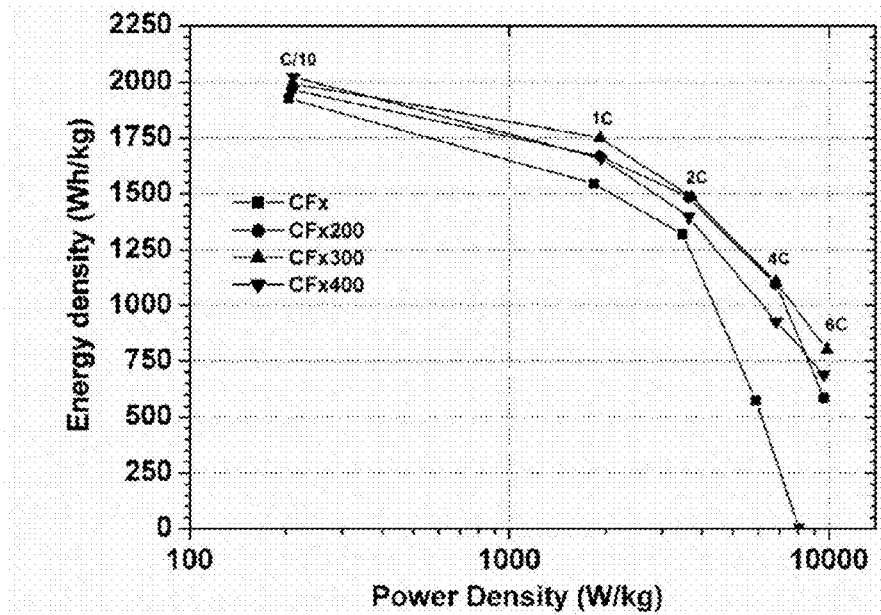
FIG. 6 outlines the ratios of the gravimetric energy density vs. the power density of CFx samples at different current densities in a so-called Ragone plot.

FIG. 6 shows a Ragone plot, i.e., the ratios of the energy density vs. the power density, of all CFx samples studied. CFx300 exhibits the best performance of the ball-milled samples. Even though the energy density is higher in case of the ball-milled samples compared to pristine CFx, the energy density of the CFx400 sample again decreased at higher C rates.

Scanning electron microscopy (SEM) images of the CFx, CFx200, CFx300, CFx400 samples were taken with at 15 keV applying a carbon tape as a substrate. As presented in FIG. 7, the pristine CFx exhibits a flake like morphology with a layered type of structure.

Figure 7:
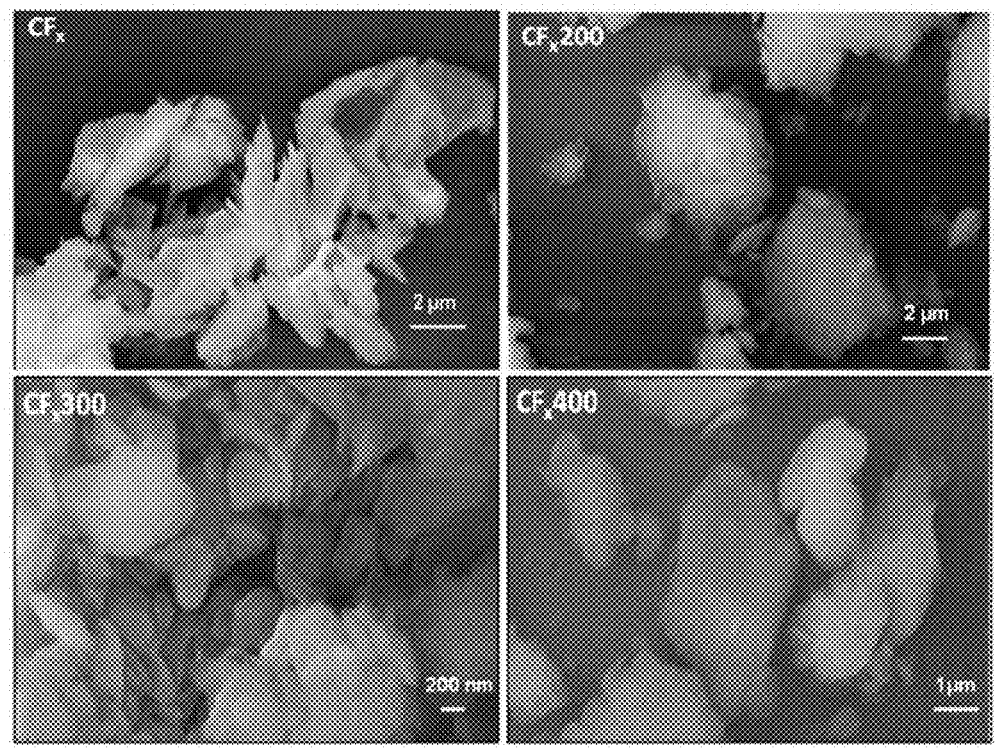
FIG. 7 presents SEM images of pristine CFx, CFx 200, CFx 300, and CFx 400 samples, respectively.

In contrast with these findings, ball-milled CFx samples in FIG. 7 show more irregular morphology and no visible layered structure. No bigger single crystalline particles could here be observed, it rather seems that the particles are aggregated. Evidence is found in the BET surface area which increased from 213 $m^2$ $g^{-1}$ in the pristine sample to 266 $m^2$ $g^{-1}$ through ball milling.

Powder X-ray diffraction patterns of pristine CFx and ball milled CFx200, CFx300 and CFx400 samples were additionally taken within the 2θ range 5-70° by applying a diffractometer equipped with Cu $K_\alpha$ radiation. Whereas the pristine CFx sample appeared phase pure and no graphite peaks could be recorded, a slight broadening of the peaks was observed in the ball-milled samples.

The present invention is not limited to embodiments described herein; reference should be had to the appended claims.

What is claimed is:

1. A lithium/graphite fluoride primary battery prepared by a process comprising:
   providing a graphite fluoride powder;
   mechanically milling the graphite fluoride powder so as to obtain an active material;
   providing a mixture comprising the active material and an electrically conductive carbon so as to form a part of a positive electrode;
   providing a body comprising lithium as a part of a negative electrode; and
   forming an electrochemical cell with the positive electrode and the negative electrode,
   wherein, the active material has a BET surface area of from 250 to 300 $m^2$ $g^{-1}$.

2. The battery as recited in claim 1, wherein the graphite fluoride powder comprises a CFx compound where 0.1 ≤ x ≤ 2.

3. The battery as recited in claim 1, wherein the electrically conductive carbon comprises a CFx compound where 1.0 ≤ x ≤ 1.2.

4. The battery as recited in claim 1, wherein the mechanical milling of the graphite fluoride powder comprises a ball milling where the graphite fluoride powder is rotated in a ball mill at a frequency of from 100 to 400 rpm.

5. The battery as recited in claim 4, wherein the ball milling is preformed over a period of from 30 minutes to 6 hours.

6. The battery as recited in claim 4, wherein the ball milling is performed with a ball to powder ratio of from 5:1 to 100:1.

7. The battery as recited in claim 1, wherein the active material has a total pore volume of from $0.12 \text{ cm}^3 \text{ g}^{-1}$ to $0.15 \text{ cm}^3 \text{ g}^{-1}$.

8. The battery as recited in claim 1, wherein the active material has a grain size of from 50 to 1000 nm.

9. The battery as recited in claim 1, wherein the positive electrode is provided by a process comprising:
   preparing a mixture comprising the active material, the electrically conductive carbon, and an organic solvent;
   preparing a slurry of the mixture and spreading the slurry on an electrically conducting substrate; and
   drying the slurry.

10. The battery as recited in claim 1, wherein the negative electrode is a lithium foil.

11. The battery as recited in claim 1, further comprising a separator.

12. The battery as recited in claim 11, wherein the separator is a glass fiber sheet.

13. The battery as recited in claim 1, further comprising an electrolyte.

14. The battery as recited in claim 13, wherein the electrolyte is a solution comprising at least one of an inorganic salt, ethylene carbonate (EC), and dimethyl carbonate (DMC).

15. A method for manufacturing a lithium/graphite fluoride primary battery, the method comprising:
   providing a graphite fluoride powder;
   mechanically milling the graphite fluoride powder so as to obtain an active material;
   providing a mixture comprising the active material and an electrically conductive carbon so as to form a part of a positive electrode;
   providing a body comprising lithium as a part of a negative electrode; and
   forming an electrochemical cell with the positive electrode and the negative electrode,
   wherein, the active material has a BET surface area of from 250 to 300 $m^2 \text{ g}^{-1}$.

16. The method as recited in claim 15, wherein the mechanical milling of the graphite fluoride powder comprises a ball milling where the graphite fluoride powder is rotated in a ball mill at a frequency of from 100 rpm to 400 rpm, for a period of from 30 minutes to 6 hours, and with a ball to powder ratio of from 10:1 to 50:1.

* * * * *